(12) United States Patent
Coughlin (10) Patent No.: US 10,688,542 B2
(45) Date of Patent: Jun. 23, 2020

(54) PORTABLE SYSTEM AND METHOD FOR PROCESSING WASTE TO BE PLACED IN LANDFILL

(71) Applicant: Trumbull Holdings, LLC, Carol Stream, IL (US)

(72) Inventor: Kevin J. Coughlin, Arlington Heights, IL (US)

(73) Assignee: Perry Ridge Landfill, Inc., Carol Stream, IL (US)

( * ) Notice: Subject to any disclaimer, the term of this patent is extended or adjusted under 35 U.S.C. 154(b) by 1033 days.

(21) Appl. No.: 15/171,033

(22) Filed: Jun. 2, 2016

(65) Prior Publication Data

US 2017/0151592 A1    Jun. 1, 2017

Related U.S. Application Data

(62) Division of application No. 14/524,134, filed on Oct. 27, 2014, now Pat. No. 9,375,767.

(51) Int. Cl.
| | |
|---|---|
| *B09B 5/00* | (2006.01) |
| *B09B 1/00* | (2006.01) |
| *B02C 21/02* | (2006.01) |
| *B02C 23/40* | (2006.01) |
| *B02C 23/02* | (2006.01) |
| *E02D 31/00* | (2006.01) |
| *B09B 3/00* | (2006.01) |
| *B01F 3/12* | (2006.01) |
| *B01F 7/04* | (2006.01) |

(Continued)

(52) U.S. Cl.
CPC .......... *B09B 3/0025* (2013.01); *B01F 3/1221* (2013.01); *B01F 7/042* (2013.01); *B01F 13/0035* (2013.01); *B02C 21/02* (2013.01); *B02C 23/02* (2013.01); *B02C 23/40* (2013.01); *B09B 1/00* (2013.01); *B09B 3/0008* (2013.01); *B09B 5/00* (2013.01); *E02D 31/00* (2013.01); *B02C 2013/28618* (2013.01); *B02C 2013/28636* (2013.01); *B09B 2220/06* (2013.01)

(58) Field of Classification Search
CPC ....... B02C 21/02; B02C 21/026; B02C 23/02; B02C 23/40; B02C 2013/2863; B02C 2013/28618; B02C 2013/28636; B09B 1/00; B09B 3/008; B09B 5/00; E02D 31/00; B01F 3/184; B01F 3/188
USPC ................ 241/12, 15, 20, 21, 46.17, 186.35
See application file for complete search history.

(56) References Cited

U.S. PATENT DOCUMENTS

| | | | | |
|---|---|---|---|---|
| 2,062,211 | A * | 11/1936 | Davis ........................ | B03B 4/04 209/471 |
| 3,825,231 | A * | 7/1974 | McFarland ............. | B01F 7/081 366/196 |
| 4,354,876 | A | 10/1982 | Webster | |

(Continued)

*Primary Examiner* — Shelley M Self
*Assistant Examiner* — Smith Oberto Bapthelus
(74) *Attorney, Agent, or Firm* — Michael P. Mazza, LLC (57) ABSTRACT

A portable system and method for processing waste to be solidified and placed in an active cell of a landfill. A portable pugmill is moveable adjacent an active cell of a landfill; and portable devices, which may be mounted on sleds or trailers, may be used for feeding the pugmill with waste to be solidified into a landfill-ready state. The waste may be fed to the pugmill without the need for long-term waste storage devices, and avoiding substantial delays between discharge of the waste from trucks to the pugmill-feeding steps.

4 Claims, 4 Drawing Sheets

(51) Int. Cl.
    *B01F 13/00* (2006.01)
    *B02C 13/286* (2006.01)

(56) References Cited

U.S. PATENT DOCUMENTS

| | | | | |
|---|---|---|---|---|
| 4,378,851 | A * | 4/1983 | deVries | A62C 3/04 169/45 |
| 4,813,614 | A * | 3/1989 | Moore | B02C 19/18 241/101.71 |
| 5,060,870 | A * | 10/1991 | Trezek | B29B 13/10 209/930 |
| 5,193,936 | A * | 3/1993 | Pal | A62D 3/33 405/128.75 |
| 5,211,750 | A | 5/1993 | Smith | |
| 5,277,826 | A | 1/1994 | Burns | |
| 5,294,065 | A * | 3/1994 | Harms | B28C 9/04 241/101.76 |
| 5,397,478 | A * | 3/1995 | Pal | B09C 1/08 210/710 |
| 5,441,206 | A * | 8/1995 | Schade | B02C 21/02 241/101.74 |
| 5,558,281 | A * | 9/1996 | Bouldin | B02C 13/04 241/189.1 |
| 5,566,893 | A * | 10/1996 | Getz | B02C 21/02 241/101.76 |
| 5,655,719 | A * | 8/1997 | Getz | B02C 21/02 241/101.76 |
| 5,705,046 | A | 1/1998 | Miwata | |
| 5,718,857 | A | 2/1998 | Howlett | |
| 5,732,367 | A * | 3/1998 | Yost | A62D 3/33 405/129.25 |
| 5,762,446 | A * | 6/1998 | Manatt | B02C 21/02 241/101.74 |
| 5,772,721 | A * | 6/1998 | Kazemzadeh | C05D 3/02 71/11 |
| 5,857,807 | A | 1/1999 | Longo | |
| 5,941,468 | A * | 8/1999 | Lewis | A61L 11/00 241/17 |
| 5,971,600 | A * | 10/1999 | Paterson | B01F 13/0013 366/150.1 |
| 5,979,804 | A * | 11/1999 | Abrams | B02C 19/0093 241/15 |
| 5,988,864 | A | 11/1999 | Bracegirdle | |
| 6,357,682 | B1 * | 3/2002 | Hext | B02C 18/141 241/161 |
| 6,383,394 | B1 * | 5/2002 | Briggs | B01D 21/0042 134/33 |
| 6,926,465 | B1 * | 8/2005 | Mann | B01D 21/01 405/128.45 |
| 7,226,006 | B2 * | 6/2007 | Porter | A61L 11/00 209/11 |
| 8,057,556 | B2 * | 11/2011 | McCarty | C10L 5/48 44/280 |
| 8,377,301 | B2 * | 2/2013 | Miller | B03D 1/02 210/295 |
| 8,641,322 | B1 | 2/2014 | Jackson | |
| 8,998,118 | B2 * | 4/2015 | Simon | B02C 21/02 241/15 |
| 9,375,767 | B2 * | 6/2016 | Coughlin | B02C 21/02 |
| 2002/0017577 | A1 * | 2/2002 | Rajewski | B02C 13/04 241/30 |
| 2004/0141877 | A1 * | 7/2004 | Devine | A61L 11/00 422/32 |
| 2005/0121295 | A1 * | 6/2005 | Niklewski | B02C 21/02 198/603 |
| 2005/0228694 | A1 * | 10/2005 | Firestone, III | A61L 11/00 705/2 |
| 2007/0199482 | A1 * | 8/2007 | Kanai | B03B 9/063 106/638 |
| 2009/0004051 | A1 * | 1/2009 | Firestone | A61L 11/00 422/28 |
| 2010/0301147 | A1 * | 12/2010 | Harkess | A61L 11/00 241/23 |
| 2011/0100924 | A1 * | 5/2011 | Duesel, Jr. | B01D 1/14 210/710 |
| 2011/0265532 | A1 * | 11/2011 | Burnham | C05C 3/00 71/8 |
| 2012/0018557 | A1 * | 1/2012 | Hubrich | B02C 21/026 241/101.71 |
| 2012/0313038 | A1 * | 12/2012 | Laros | C02F 11/14 252/194 |
| 2014/0251881 | A1 * | 9/2014 | Duesel, Jr. | C02F 1/048 210/149 |
| 2015/0338162 | A1 * | 11/2015 | Hoffman | F26B 5/041 34/429 |
| 2016/0114364 | A1 * | 4/2016 | Coughlin | B02C 21/02 405/129.3 |
| 2016/0167095 | A1 * | 6/2016 | Coughlin | B09B 3/0041 405/129.3 |
| 2017/0151592 | A1 * | 6/2017 | Coughlin | B02C 21/02 |

* cited by examiner

PORTABLE SYSTEM AND METHOD FOR PROCESSING WASTE TO BE PLACED IN LANDFILL

CLAIM FOR PRIORITY TO PRIOR APPLICATION

This is a divisional application claiming priority from U.S. Ser. No. 14/524,134, titled "Portable System and Method for Processing Waste to Be Placed in Landfill," filed Oct. 27, 2014.

BACKGROUND OF THE INVENTION

The present invention relates to systems and methods for treating landfill waste using a portable pugmill system.

Operating landfills are provided with liquid and solid waste on a constant basis. Some of these waste materials must be further processed before they can be legally entombed within a landfill. This processing may include mixing waste liquids, sludges and other semi-solid wastes with absorbent materials or other solid (dry) wastes (termed here "waste solidification operations"), before the resulting mixture is sufficiently devoid of any "free liquids" so that it may be legally disposed within an active landfill cell. Examples of liquid wastes that may be treated by the present invention include, but are not limited to, various approved liquid wastes, landfill leachate, or surface water from the landfill or off-site locations.

Currently, the required waste solidification operations may be performed in "batch" processing techniques using open-top, leakproof containers located in an area of the landfill that has both a certified liner and an operating leachate collection system. This is a time-consuming and inefficient process which requires a large portion of the landfill that could otherwise be devoted to stored waste.

Another processing technique to achieve sufficient waste solidification that has been used in the past has been a large, expensive fixed system, using a processing plant with a fixed pugmill fed by a fixed, large overhead silo not adapted to be portable. No discharge conveyor is used; instead, a truck drives under the pugmill, which drops the solidified waste into the truck, for delivery to the landfill.

Pugmills used in the systems of the present invention can weigh 6 tons or more. Horsepower requirements for the required multiple motors (for, e.g., pugmill, conveyors, generators, etc.) may be 300-350 hp or more. Also, the area of a landfill typically comprises low-grade, unstable materials such as wet clay with little bearing strength, and spongy municipal solid waste (residential garbage). Further, one end of each of the conveyors is typically ten feet or more off the ground. These issues, including issues of alignment, vibration control, leveling, stability in wind, deterioration in rain and snow, adequate 3-phase electrical power source, and practicality of maintenance, which can routinely be handled by a fixed (non-portable) system, provide many reasons not to attempt to make such a processing system portable.

If one were thinking of changing a fixed processing system into a portable processing system, a natural approach would be to mount the system on wheels for ease of movement. However, landfill conditions make such an approach problematic. For example, a landfill typically provides variable, uneven terrain, which may include wet clay and spongy municipal solid waste. In wet conditions, the terrain is conducive to mud. Such conditions may make it difficult if not impossible to wheel conveyors or other equipment, and outriggers may be needed to stabilize the equipment.

Large capacity solid storage systems are also easily provided with a fixed system (e.g., using a silo), which is problematic if the system is to be made portable. Such large capacity, tall silos, for example, cannot easily be secured against wind loads, and are difficult to move. For example, if a system were to be made portable, it must be typically capable of processing 1-2 truckloads (25 tons/load) very rapidly (about 15 minutes/load, while the truck waits) without using tall vertical silos as used in fixed systems, as such silos cannot be safely transported in landfill conditions. By comparison, a fixed system with tall vertical silo(s) may take about 45 minutes to pneumatically load (per truck) and then another 15 minutes/truck to feed the pugmill and process the material.

A test for determining whether a liquid waste solidification process produces waste which can be legally entombed within a landfill is known as the Paint Filter Test ("the PFT"). The PFT is used to simulate the behavior of liquids contained in sorbents to be placed in landfills. The purpose of the PFT is to determine if excess liquids will be released from containerized wastes. The basis for the test derives from an EPA rule (Section 3004 (c) (2) of HSWA), which prohibits the placement of bulk or containerized liquids in landfills. The PFT is a simple, easy to conduct test that is relatively inexpensive to perform, and that has been used to determine the presence of free liquids in bulk or containerized waste since 1985. It consists of placing a sample (normally 100 ml or 100 g) into a conical paint filter (mesh number 60). The paint filter is suspended from a tripod or ringstand for five minutes. If any portion of the material passes through and drops from the filter in this time, the material is deemed to contain free liquids and cannot be disposed of in a landfill.

Another feature that can render material unsuitable for a landfill is dust. Various regulations monitor the amount of dust associated with landfill materials, given the danger to landfill operators and personnel in the vicinity of a landfill due to dust. It has been determined that dust regulations will be satisfied by a relatively simple test: the material to be placed in a landfill must be in the range of about at least 5% (20:1 solids-to-liquid ratio by weight)-20% (4:1 solids-to-liquid ratio, by weight) moisture by weight. Typically, this "moisture test" is determined by a laboratory, which weighs the material, then bakes off the moisture and weighs it again. However, an experienced landfill operator can typically determine whether the moisture test will be met by visual observation, coupled with periodic lab tests. If dust becomes an issue, the operator can simply add liquid to the pugmill.

SUMMARY OF THE INVENTION

The objects mentioned above, as well as other objects, are solved by the present invention, which overcomes disadvantages of prior systems and methods, while providing new advantages not previously associated with them.

The present invention may utilize one or more solid material feed conveyors, a communicating portable pugmill type liquid/solid mixing unit, and a receiving conveyor for the solidified mixture discharged from the pugmill. The system of the invention enables the more effective and efficient mixing of waste liquids with dry material in order to produce a solidified product suitable for disposal in an active landfill cell. The system enables the landfill to process a wider range of waste materials, such as certain types of coal combustion waste that have proven difficult to dispose of in a typical landfill active cell. Additionally, pugmill processing greatly reduce fugitive dust that might otherwise be released from the waste as it is disposed in the landfill cell. Such dry coal combustion wastes typically consist of all forms of fly ash, bottom ash and other pollution control coal combustion byproducts that are amenable to solidifying water-based liquids.

In a preferred embodiment of the invention, a portable system for processing waste so that it can be made landfill-ready is provided. The waste initially contains free liquids and requires the addition of solids in a solidification process. The system includes a portable pugmill which can be moved to various locations atop an active cell of a landfill; and one or more portable devices for facilitating periodic feeding of the pugmill with waste to be solidified into a landfill-ready state. The waste may be discharged from a truck to the one or more devices, and then may be fed to the pugmill without using long-term storage devices, and avoiding any substantial delay between waste unloading from the trucks and feeding of the pugmill.

In preferred embodiments, the portable conveying devices may be a conveyor for transporting solids to the pugmill, and a liquid pump for transporting liquid or sludge waste to the pugmill. A live floor trailer may be used to provide waste solids to the conveyor. Alternatively, solid waste may be transferred from a pneumatic truck to a portable short silo and then directly fed to the pugmill through an airlock.

To facilitate their mobilization and portability, the pugmill and the portable feed and discharge devices may be mounted on one or more structural sleds suitably designed to move over variable, nonuniform and uneven landfill terrain. (As discussed below, instead of structural sleds, although this may be less preferred, such devices may be mounted on trailers, or comprise generic wheeled structures.)

A portable generator is preferably used to provide power to the pugmill and to the portable devices. The pugmill may have a variable frequency drive.

Preferably, the waste is tested for compliance with the PFT test before being placed in the landfill.

As a working example, the waste may include coal ash, with about a 1:1 weight ratio of coal ash to water-based liquids mixed within the pugmill. The waste may also include scrubber waste, in which about a 2:1 weight ratio of scrubber waste solids to water-based liquids may be mixed within the pugmill.

Preferably, for the solids component of the waste, the system does not separately store the solids component. The pugmill can be fed with a live floor trailer and feed conveyor, or with a portable silo straddling the pugmill. The portable silo may be fed with the solids component using pneumatic trailers.

Dust hoods applying negative induction pressure within the portable feed conveyors may be used to limit dust generated there.

An electronic control panel and an automatic electronic measuring system may be used, to allow an operator to specify solid and liquid ratios and flow rates into the pugmill.

Landfill-ready waste processed by the pugmill(s) may be discharged to haul trucks for depositing in an active cell of the landfill, or may be discharged directly into an active cell of the landfill.

A method for processing waste so that it can be made landfill-ready also forms part of the present invention. The waste may initially contain free liquids and require a solidification process. One or more portable solids feed devices (conveyors and/or short silos) may be provided, for transporting a solids component of the waste to a portable pugmill. One or more portable liquids feed devices may also be provided, for transporting a liquids component of the waste to the portable pugmill. The solids and liquids components may then be mixed within the pugmill at one or more predetermined, desired ratios, so that the mixture is landfill-ready. The landfill-ready waste may then be transported directly from the pugmill into haul trucks for depositing into an active cell of the landfill, or may be discharged directly into the active cell.

The portable solids feed devices may include conveyors, and the portable liquids feed devices may include liquid pumps. These devices may each be mounted on trailers or sleds or bearing pads, or wheeled structural devices (e.g., devices including wheeled columns supporting the conveyors, pugmill and silo). The solids component of the waste may be discharged from trucks to the portable solids feed devices and then fed to the pugmill without any substantial delay between the trader unloading and pugmill feeding steps. A portable silo straddling or adjacent the pugmill may be provided. The silo directly feeds the solids component, without storage, through an airlock into the pugmill. The pugmill and the portable solids and liquids feed devices may be mounted on one or more sleds or trailers or hearing pads or wheeled structural devices. The portable solids conveyors may include dust hoods applying negative induction pressure to limit dust generated there. Samples of the waste may be periodically tested for compliance with the PFT and moisture tests.

DEFINITION OF CLAIM TERMS

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Landfill-ready" or "landfill-ready waste" means waste that can be legally placed in a landfill.

"Portable pugmill" means a pugmill mounted on or supported by a sled or trailer or wheeled structural device (e.g., a device including wheeled columns supporting the conveyors, pugmill and silo.

"Portable silo" means a silo mounted on or supported by a sled or trailer or wheeled structural device, or mounted on steel bearing pads that rest directly on the landfill active cell and have no fasteners tied to the cell.

"Sludge" means waste with a substantial free liquids component.

BRIEF DESCRIPTION OF THE DRAWINGS

The novel features which are characteristic of the invention are set forth in the appended claims. The invention itself, however, together with further objects and attendant advantages thereof, can be better understood by reference to the which:

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
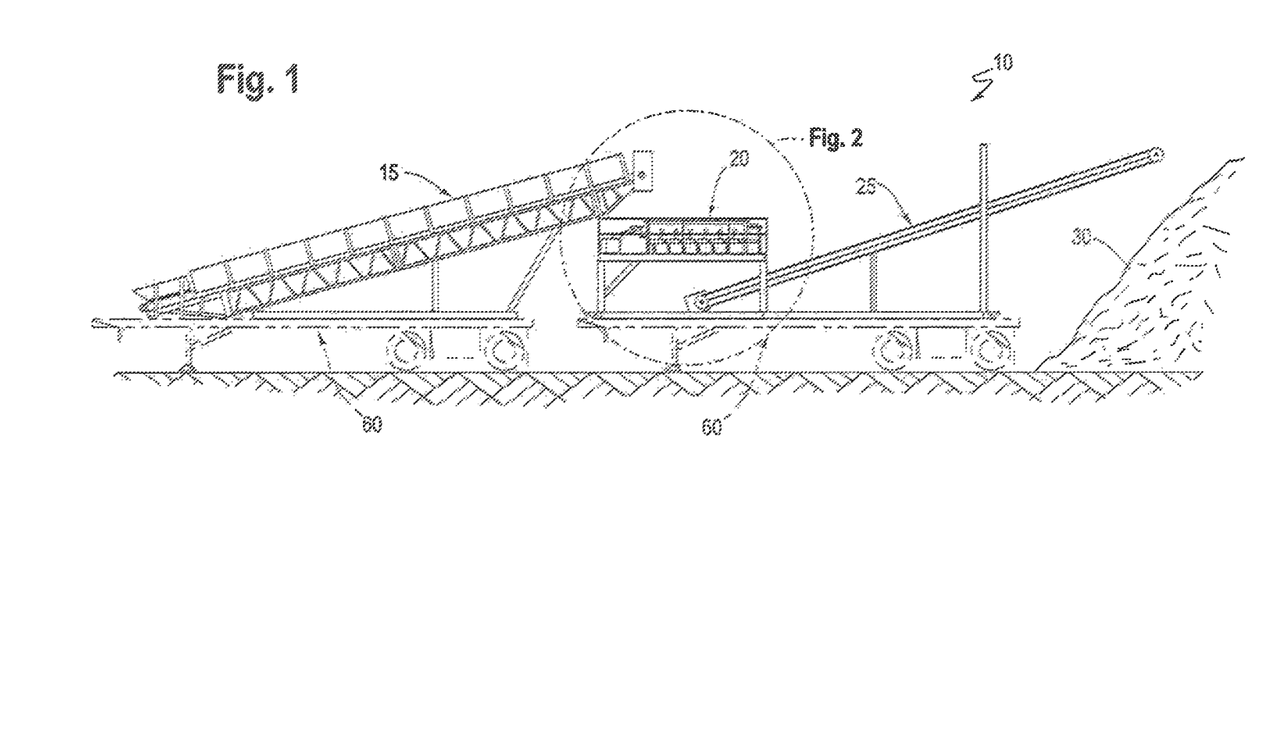
FIG. 1 is a perspective view of one preferred embodiment of the present invention.
Figures 2, 3:
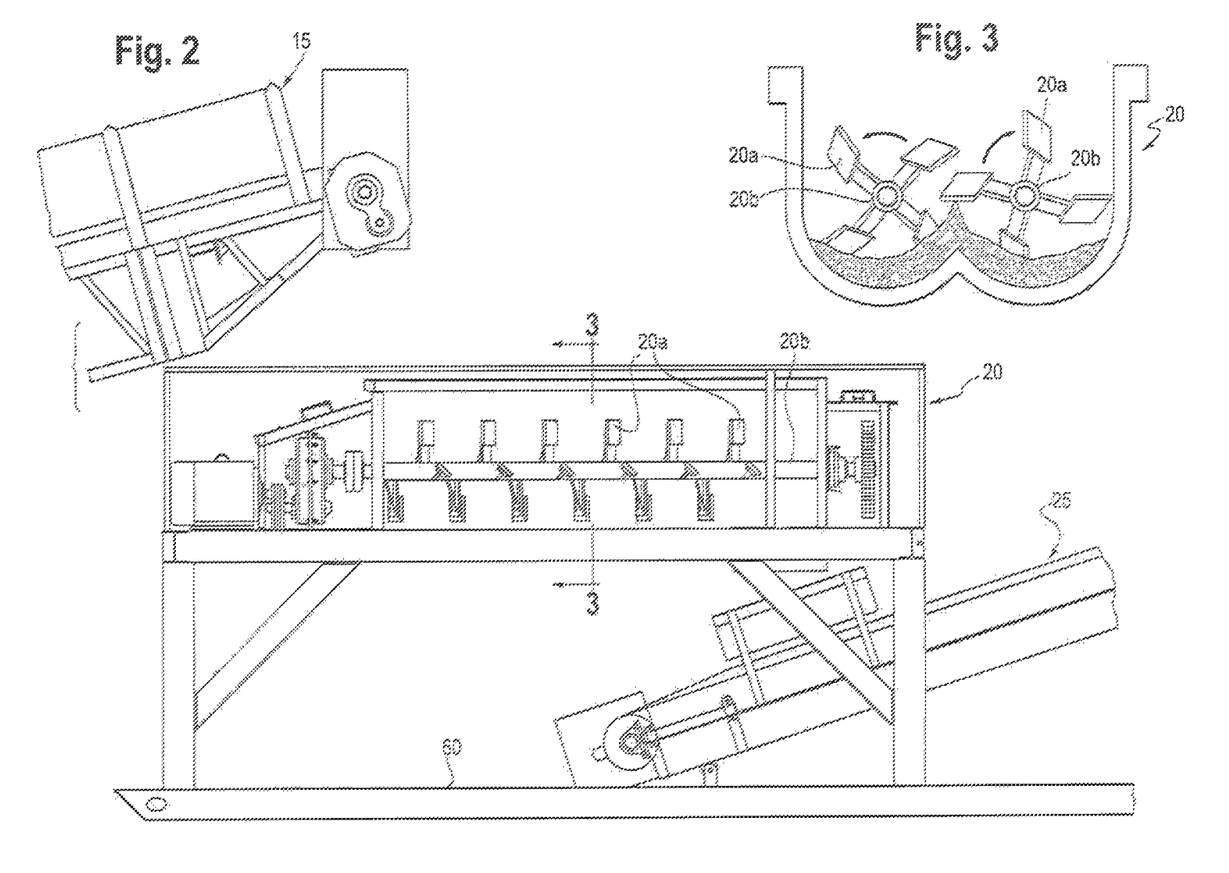
FIG. 2 is an enlarged view of the portion of the system circled on FIG. 1.
FIG. 3 is a sectional view taken along reference line 3/3 of FIG. 2.

Referring now to FIG. 1, a preferred embodiment of the portable system of the present invention for solidifying sludge waste and transporting it either to haul trucks for depositing to an active cell of a landfill, or for direct discharge into the active cell, is shown and generally referred to by reference numeral 10. With system 10, dry solids may be truck-fed onto an intake conveyor 15, and discharged into pugmill 20, such as a double-paddle mixing pugmill having blades 20a set on multiple rotor shafts 20b. Simultaneously, a liquid pump (not shown), such as a 3-inch or 4-inch diameter liquid pump, may be used to feed liquid/sludge waste into pugmill 20. The liquid pump may have flexible inlet piping to connect to liquid waste storage containers which may be mounted on a tanker, trailer, for example (not shown). The liquid pump may also have flexible outlet piping (with a flow-restricting valve, not shown, to control flow rate) to connect to pugmill 20, to deliver liquid/sludge waste stored in the tanker trailer(s) (e.g., liquid waste, leachate or water) to pugmill 20. The flow rate of the liquid feed should be sufficient to control dust, or to wet the dry solids to the point where the mixture will meet the Paint Filter Test ("PFT") requirements. The resulting solidified waste, suitable for landfill storage, may then be discharged from outtake conveyor 25 into a haul truck, or directly into an active cell 30 of a landfill. As examples, conveyor 15 may be about 12-feet in the air at its highest point, whereas conveyor 25 may be about 15-feet in the air at its highest point.

Approximate mixing ratios have been developed that will pass the required PFT test for two common solid feed materials that may be processed by the present invention: (a) coal ash (1:1 by weight, solids to water-based liquids); and (b) scrubber waste (2:1 by weight, solids to water-based liquids). (In a coal power plant, combustion products from the stack are "scrubbed," removing sulfur and other pollutants, using components such as calcium carbonate and gypsum.) The pugmill solid and liquid feed rates may be adjusted in order to provide these ratios.

Other solid feed materials may be used, of course, and different weight ratios may be developed. Non-limiting examples of solid feed materials that may be treated by the present invention include: scrubber waste from scrubber systems operating on other combustion products (e.g., cement kilns, etc.); sawdust; auto fluff (shredded, non-metal portions of automobiles); by-products from the coal combustion, such as fly ash, bottom ash; diapers, or any other solidification materials approved by the permit, etc.

Referring again to FIG. 1, solidified waste discharged from pugmill mixer 20 may be permitted to drop onto receiving conveyor 25, which can be configured to deposit the material directly into a waiting haul truck, or directly into an active cell of a landfill. Samples of the material discharged from the pugmill mixer may be periodically obtained and subjected to a Paint Filter Test to verify that no free liquids are present.

As a non-limiting example, the conveyors and pugmill may be obtained from Pugmill Systems Inc. of Tennessee, or other manufacturers in the industry.

In a particularly preferred embodiment of the present invention, the pugmill, short silo and conveyors may be mounted on sleds, such as structural steel sleds 60, providing both the ability to transport this equipment, while also the ability to do so in a stable manner, despite often the presence of difficult (uneven, muddy, etc.) landfill terrain. A sled can also more easily be leveled than wheeled conveyors. (Alternatively, although less preferred, a trailer may be used to mount the pugmill, short silo and conveyors. As discussed below, bearing pads (such as for the portable silo) or wheeled structural devices may also be used.)

Preferably, the sled is flexible enough to accommodate uneven and unstable landfill terrain, while strong and stiff enough to hold the operating equipment in a stable manner under dynamic loading during operation. Further, the sled frame must be able to be easily leveled using, e.g., timbers at different frame locations, as dictated by the ground conditions of the final set-up, without inducement of excessive stress.

Ancillary equipment for the system may include a portable trailer (or, alternatively, sled-mounted or bearing-pad mounted) which may be used to mount one or more diesel-powered generators, such as with a capacity of 200-300 KW (460/480V 3-phase) or larger, liquid storage containers, and an electric-powered (e.g., 3-4 inch diameter) liquid pump. The generator can be electrically connected to the pugmill system control panel, which then powers all necessary electric equipment.

A control panel (not shown) may be used to control the speed/rate of intake conveyor 15, pugmill 20 and discharge conveyor 25, and other ancillary equipment which may be used, such as a silo airlock, a silo aerator and a silo dust-house vibrator (discussed below).

Depending on the waste being landfilled, some landfill customers may require delivery of their waste in trucks with live floor trailers, which then deposit the waste onto an inclined feed conveyor (feed mode A or "FMA") leading to the pugmill. (One live floor trailer which may be used is the 45-foot Aluminator trailer (4266542) manufactured by Valley Farm Industries of Nebraska, which allows the discharge of solids with minimal dust generation.) Other landfill customers may have different waste which requires its delivery via pneumatic trucks, which may then feed the waste into short-silo storage (feed mode B or "FMB"), which in turn gravity-deposits the waste into the pugmill, using the airlock to control feed rate. In FMB, for example, one to four pneumatic trucks may be used to unload solids simultaneously for immediate processing. (Again, no long-term material storage is required).

Figure 4:
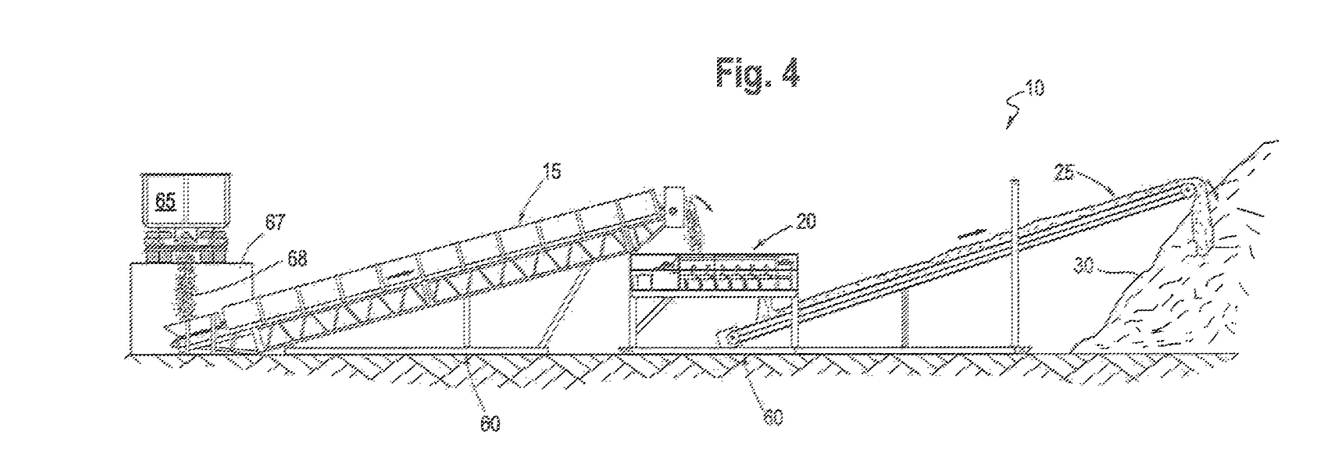
FIG. 4 is a perspective view of an alternative embodiment of the present invention.

Referring to FIG. 4, an embodiment in FMA mode is shown. Here, a truck with a live floor trailer 65 may be positioned, for example, and delivers solid waste down chute 68 onto conveyor 15, which delivers the solid waste to pugmill 20, where it may be mixed with liquids (not shown) and the resulting waste suitable for a landfill may be delivered by conveyor 25 either to a haul truck for 30 of the landfill, for example.

Figure 5:
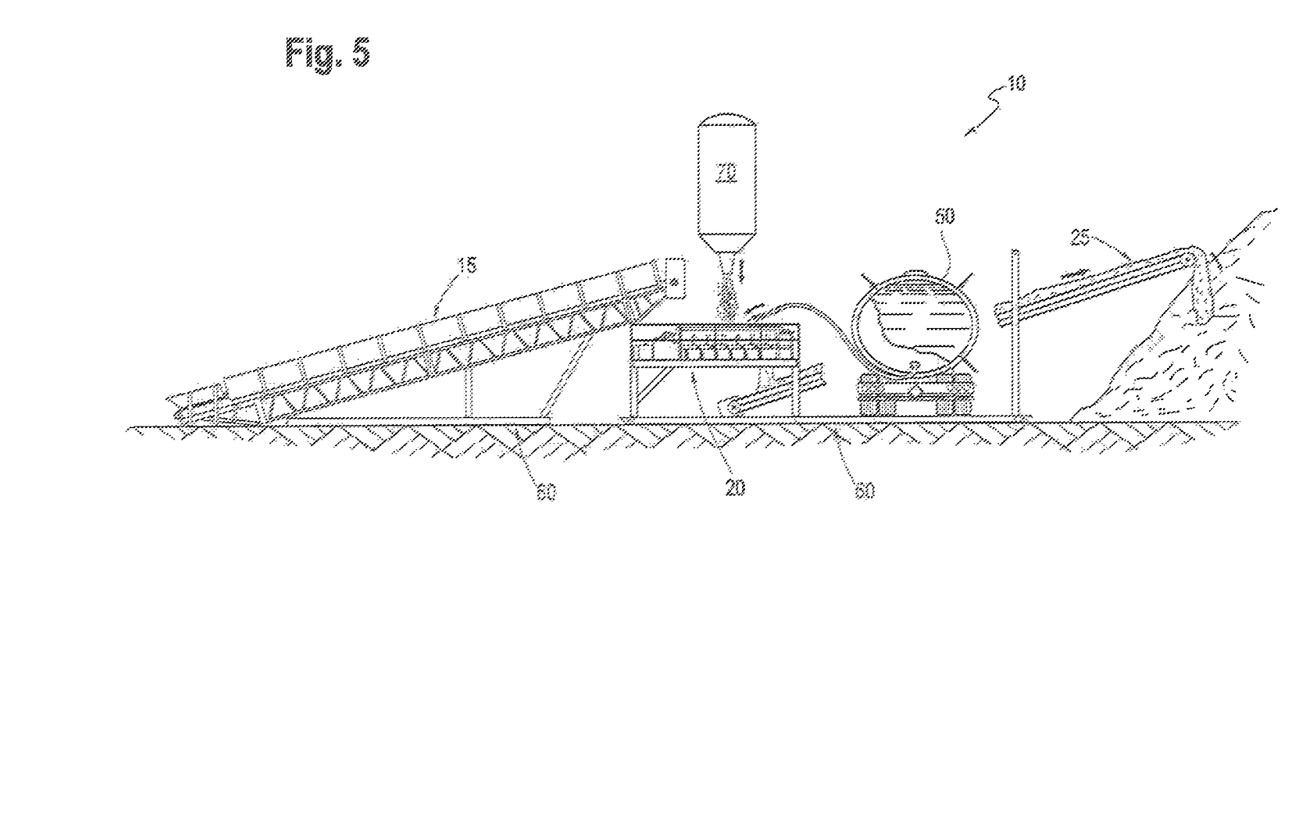
FIG. 5 is a perspective view of another alternative embodiment of the present invention.

Referring to FIG. 5, an embodiment in FMB mode is shown. A short portable silo 70 may be employed to straddle or stand beside pugmill 20 (portable structural components for holding the silo over the pugmill are not shown), allowing unloading and feeding solids using pneumatic trucks (not shown), into the silo, and then from the silo into the pugmill. A pumper truck 50 can also deliver sludge or water-based waste into the pugmill, as shown.

Instead of resting on a transportable sled or a trailer, portable silo 70 may rest on bearing pads (e.g., flat steel plates), which rest directly on the active cell of a landfill. When it needs to be moved, portable silo 70 may be lifted and dropped by a crane or other device, or it may be dragged on its bearing pads. Portable silo 70 has no listeners (such as anchor bolts) tied to the landfill. However, the columns supporting the portable silo may be welded to the bearing pads. Alternatively, a wheeled structural device may be used to support the silo.

Preferably, the present invention can accommodate either of the two modes FMA or FMB. The system solid feed mode may preferably be switched back and forth between FMA and FMB, at the operator's discretion, taking negligible time to do so. For example, if in FMA mode and the operator desires to switch to FMB mode, power to the feed conveyor (intake to pugmill) may be switched off, and a chute may be opened between the short silo and the pugmill; now, hose/pipe fittings for one or more pneumatic trucks may be connected to the silo intake nozzle(s), and the short silo airlock, dusthouse equipment and vibrators may be powered on; and finally the pneumatic truck systems may be started, conveying the solids into the short silo, which then gravity-feed into the pugmill through the airlock which controls the feed rate.

To further eliminate dust, a dust hood may be provided that fits over feed conveyor 15, while allowing the trailer to back into the dust hood. The dust hood may be under induction draft fan negative pressure, so that any dust generated during solids unloading and conveying may be drawn into covered conveyor 15. A manual or automatic shutoff may be provided in the dust hood if sensors determine that dust guidelines (such as the 5-20% moisture content test, by weight) are not being met.

It is believed that use of the system disclosed here will generate a negligible amount of dust in the sealed feed conveyor, pug mill and discharge conveyor. As some dust may be generated during truck unloading into the feed hopper, if needed a negative pressure dust-hood with a conventional induction draft blower may be provided, as discussed above which the truck can back into. Any dust inside the dust-hood can be conveyed to an opening in the feed conveyer.

An automatic solid and liquid electronic measuring and control system can be readily engineered, such as by using microprocessors and motors available from Allen Bradley of Milwaukee, or other manufacturers, and using appropriate electronic sensors, to provide real-time feed rates to the pugmill of solid and liquid waste streams. Additionally, the electronic measuring system may also be used to provide real-time pugmill product discharge flow rates and the percentage make-up of liquids and solids in the waste discharge. Using these enhancements, a closed loop control system may be provided, in which a single operator could specify the desired liquid/solid ratios, by weight percentage, of the mixture from the pugmill, and the feed conveyor rate (i.e., belt speed) and liquid waste flow rate (flow valve) could be adjusted to produce these desired liquid/solid ratios. Only occasional sampling for PET compliance would then be required as the waste is landfilled.

Electrical switch gear (panel boxes, disconnects, breakers, etc.) may be obtained from Square D of Illinois (now owned by Schneider Electric), or other manufacturers. The electric motors, for turning the dual pugmill shafts, for driving the discharge and feed conveyor belts, for the portable silo motors, and for the fan motor for driving the dust hood fan, may be obtained from General Electric (Indiana), or other manufacturers. The GE pugmill motors turn about 1800 rpm, and the pugmill shafts turn about 30 rpm, using a speed reducer which may be obtained from Dodge/Baldor (Arkansas). The variable frequency drive for the pugmill may be obtained from Danfoss (Denmark). The liquid pump(s) referenced above may be obtained from any of the following sources: Godwin (New Jersey); Wacker (Wisconsin); or Gorman/Rupp (Ohio). An electrical generator(s) may be obtained from Caterpillar Tractor Company. The short, portable silo referenced above may be obtained from Belgrade (Minnesota). The electronic controls may be obtained from Allen Bradley (Wisconsin), as described above. These items are available from alternative manufacturers as well.

In the preferred embodiment disclosed here, exemplary electrical (horsepower, "HP") requirements may be as follows: first pugmill motor (50 HP); second pugmill motor (50 HP); feed conveyor motor (20 HP); discharge conveyor motor (20 HP); silo air-lock motor, if used (5 HP); silo aerator motor, if used (4 HP); silo dusthouse vibrator, if used (1 HP); pump (up to 50 HP). The total power requirements may be up to 250 HP.

A person of ordinary skill in this art will now readily appreciate various advantages of the present invention. The system can be made entirely portable, enabling it to be located anywhere over a landfill area that has both a certified liner and an operating leachate collection system, including an active cell face. This enables the landfill operator to process the final waste product at a location closely adjacent to its final destination. Also, once initially erected, the systems disclosed may take no more than 1-2 days to move and set-up at a new location in the landfill. Additionally, in a preferred embodiment, the system does not require any dry material storage capacity; dry solids may be processed as they are unloaded from either live-floor or pneumatic tractor trailers.

If necessary, to alleviate equipment layout challenges at the selected waste solidification location, the feed conveyor can be rotated and operated up to 90 degrees in either direction from the straight-on configuration shown in FIG. 1. The system disclosed here will accept up to 25 tons of dry combustion waste which may include coal ash, bottom ash, or scrubber waste, from a live-floor transport trailer, and process it in a relatively short period of time, such as the about 15-minute unloading time (300 tph), in a nearly dust-free condition. The dry solids will be mixed with up to 25 tons of liquid, also in the same short period of time of about 15 minutes (300 tph=1200 gpm). Of course, the system disclosed here can be scaled up or down to process greater or lesser amounts of liquid waste.

Should insufficient dry coal combustion waste be available to mix with incoming liquid wastes, any permit-approved solid/special waste or permit-approved solidification material (I.e., currently permitted reagents, absorbents and purchased solidification materials) may be used for pugmill liquid waste solidification. Landfill liquid waste, leachate waste or lakewater may be transported to the pugmill via a tanker truck.

If it is desired to deliver solids via multiple pneumatic trucks, the system may be retrofitted with a short upright silo, for example, that includes a powered air-lock, aerator, and dust-house vibrator. The silo may be installed to straddle or mount beside the pugmill, and may be filled by one to four pneumatic trucks simultaneously. Each truck, holding for example 20-25 tons of solids, can deliver their solids to the silo in about 30-45 minutes. If this feature is used, this will provide two modes of feeding the pugmill that can be easily switched back-and forth.

The above description is not intended to limit the meaning of the words used in the following claims that define the invention. Persons of ordinary skill in the art will understand that a variety of other designs still falling within the scope of the following claims may be envisioned and used. As another example, dust hoods and other accessories are optional, as indicated above. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A method for processing waste so that it can be made landfill-ready, the waste initially containing free liquids and requiring a solidification process, comprising the steps of:
   very rapidly, both discharging a solid component of the waste from trucks to one or more portable solid feed devices and then also feeding the waste solid into a portable pugmill, without any substantial delay between the truck-discharge and pugmill-feeding steps, and without the need for using any long-term storage device for the waste solid;
   providing one or more portable liquid feed devices for transporting a liquid waste to the portable pugmill;
   mixing the solid and liquid waste within the portable pugmill at one or more predetermined, desired ratios; so that the mixture is landfill-ready; and
   transporting the landfill-ready waste directly from the pugmill either: (a) into haul trucks and then into an active cell of the landfill; or (b) directly into an active cell of the landfill;
   wherein the one or more portable solid feed devices and the one or more portable liquid feed devices are each mounted on one or more transportable sleds, or one or more trailers, or one or more wheeled structural devices.

2. The method of claim 1, wherein the one or more portable solid feed devices comprise one or more conveyors, and wherein the one or more portable liquid feed devices comprise one or more liquid pumps.

3. The method of claim 1, further comprising a portable silo straddling the pugmill, and wherein waste solids are conveyed from a pneumatic truck to the portable silo and then directly fed to the pugmill.

4. The method of claim 1, wherein samples of the waste are periodically tested for compliance with paint filter test and moisture tests.

* * * * *

UNITED STATES PATENT AND TRADEMARK OFFICE
CERTIFICATE OF CORRECTION

PATENT NO.         : 10,688,542 B2
APPLICATION NO.    : 15/171033
DATED              : June 23, 2020
INVENTOR(S)        : Coughlin It is certified that error appears in the above-identified patent and that said Letters Patent is hereby corrected as shown below:

Column 10, Line 4, should read --feed devices--
    Column 10, Line 7, ";" should be deleted and replaced with --,--

Signed and Sealed this
Fourth Day of August, 2020

Andrei Iancu
*Director of the United States Patent and Trademark Office*